United States Patent
Brereton et al.

(10) Patent No.: US 10,377,629 B2
(45) Date of Patent: Aug. 13, 2019

(54) METHOD AND APPARATUS FOR VAPORIZING LIQUID CHLORINE CONTAINING NITROGEN TRICHLORIDE

(75) Inventors: Clive Brereton, Richmond (CA); Sergio Berretta, Vancouver (CA)

(73) Assignee: NORAM International Limited, Dublin (IE)

( * ) Notice: Subject to any disclaimer, the term of this patent is extended or adjusted under 35 U.S.C. 154(b) by 1627 days.

(21) Appl. No.: 13/262,151

(22) PCT Filed: Mar. 6, 2010

(86) PCT No.: PCT/IB2010/000467
§ 371 (c)(1),
(2), (4) Date: Sep. 29, 2011

(87) PCT Pub. No.: WO2011/110879
PCT Pub. Date: Sep. 15, 2011

(65) Prior Publication Data
US 2012/0017848 A1  Jan. 26, 2012

(51) Int. Cl.
*F22B 33/00* (2006.01)
*C01B 7/075* (2006.01)

(52) U.S. Cl.
CPC ................... *C01B 7/075* (2013.01)

(58) Field of Classification Search
CPC ........... F22B 37/48; F22B 37/54; B01D 53/54
USPC .................... 122/21, 414, 332–334; 423/235
See application file for complete search history.

(56) References Cited

U.S. PATENT DOCUMENTS

| | | | |
|---|---|---|---|
| 2,199,797 A * | 5/1940 | Hunter | 95/211 |
| 2,692,818 A | 10/1954 | Bewick | |
| 3,568,409 A | 3/1971 | Ferguson et al. | |
| 4,138,296 A | 2/1979 | Balko et al. | |
| 4,230,673 A * | 10/1980 | Balko et al. | 422/225 |
| 5,437,711 A * | 8/1995 | Kaolin et al. | 95/182 |

(Continued)

FOREIGN PATENT DOCUMENTS

| | | |
|---|---|---|
| CN | 101343040 | 1/2009 |
| CN | 101407314 | 4/2009 |

(Continued)

OTHER PUBLICATIONS

JP 63-271083—English. Nov. 8, 1988.
(Continued)

*Primary Examiner* — Steven B McAllister
*Assistant Examiner* — Ko-Wei Lin
(74) *Attorney, Agent, or Firm* — McKee, Voorhees & Sease, PLC

(57) ABSTRACT

A method of safely vaporizing liquid chlorine containing high concentrations of nitrogen trichloride contaminant from a chloralkali plant. In a vertical plug-flow vaporizer having an upward flow direction, a stream of liquid chlorine containing nitrogen trichloride is received. A gas such as air, nitrogen or chlorine gas is introduced into the liquid stream upstream of the boiling zone of the vaporizer to induce a flow regime, for example annular flow or mist flow, that prevents a mass accumulation of nitrogen trichloride in the vaporizer. The liquid chlorine containing nitrogen trichloride is vaporized. The resulting gas stream may be processed to destroy the nitrogen trichloride and recycled to the chlorine production train.

19 Claims, 2 Drawing Sheets

(56) References Cited

U.S. PATENT DOCUMENTS

| | | | |
|---|---|---|---|
| 5,639,422 A | 6/1997 | Chen et al. | |
| 8,685,147 B2 | 4/2014 | Ariki et al. | |
| 2002/0029883 A1* | 3/2002 | Vinegar | E21B 17/003 |
| | | | 166/250.15 |

FOREIGN PATENT DOCUMENTS

| | | | |
|---|---|---|---|
| CN | 101446381 | | 6/2009 |
| EP | 0730902 | * | 8/1996 ............... B01J 4/00 |
| EP | 0730902 | | 10/2001 |
| JP | 63271083 | | 11/1988 |
| JP | 8243376 | | 9/1996 |
| JP | 2000146432 | | 5/2000 |
| JP | 2002316804 | | 10/2002 |
| JP | 2006143571 | | 6/2006 |
| WO | 2007043203 | | 4/2007 |

OTHER PUBLICATIONS

JP 08-243376—English Abstract. Sep. 24, 1996.
JP 2000-146432—English Abstract. May 26, 2000.
JP 2002-316804—English Abstract. Oct. 31, 2002.
JP 2006-143571—English Abstract. Jun. 8, 2006.
English Abstract of CN 101446381—(Guiy-N) Guiyang Aluminum Magnesium Design&Res, XP-002599824—Thomson Scientific, London, GB; Class Q69, AN 2009-K40537 & CN 101 446 381 A Jun. 3, 2009.
English Abstract of CN 101407314—(Shan-N) Shandong Luxi Chem Eng. Co. Ltd; XP-002599825—Thomson Scientific, London, GB; Class E36, AN 2009-H74378 ( & CN 101 407 314 A, Apr. 16, 2009.
Gustin et al.: Safety of chlorine production and chlorination processes: Chemical Health and Safety, American Chemical Society, Washington, DC, US LNKD-D01:10.1016/J. CHS.2004.08.002, vol. 12, No. 1, Jan. 1, 2005 (Jan. 1, 2005), pp. 5-16, XP025311177, ISSN: 1074-9098 [retrieved on Jan. 1, 2005] p. 6, col. 2, paragraph 4-5, Section: Nitrogen Trichloride.
International Search Report, Noram International Limited, PCT/IB2010/000467, dated Sep. 24, 2010.
CN 101343040A—Yu et al.—English Translation Jan. 14, 2009.
Noram International Limited—Application No. 201080018797.8 filed Mar. 6, 2010—Search Report dated Mar. 10, 2014.
Xiong, Shuiying, "Design of Liquid Chlorine Evaporator System", Water and Wastewater Engineering, vol. 25, No. 10, pp. 63-66.
Xiong, Shuiying, "Design of Liquid Chlorine Evaporator System", Water and Wastewater Engineering, vol. 25, No. 10, pp. 63-66.—English Translation.

* cited by examiner

METHOD AND APPARATUS FOR VAPORIZING LIQUID CHLORINE CONTAINING NITROGEN TRICHLORIDE

CROSS-REFERENCE TO RELATED APPLICATIONS

This is a National Phase application claiming priority to PCT/IB2010/000467 filed Mar. 6, 2010, of which is herein incorporated by reference in its entirety.

BACKGROUND OF THE INVENTION

The invention pertains to the processing of a stream of liquid chlorine containing nitrogen trichloride from a chlorine production process, for example a chloralkali production process.

In the industrial production of chlorine, a small amount of by-product nitrogen trichloride ($NCl_3$) is produced. In a chloralkali production process the amount formed is proportional to the amount of ammonia present in the salt fed to the process. Nitrogen trichloride follows the product chlorine leaving the chloralkali cell house.

Nitrogen trichloride is an unstable compound that detonates when it reaches a critical concentration, reported to be about 13 wt %, though it is believed that nitrogen trichloride decomposes to create dangerous conditions at concentrations as low as 3 wt %. However, a critical mass of nitrogen trichloride is also required before it is considered capable of damaging equipment. According to a report of the Chlorine Institute Inc. a typical chlorine vessel with a wall thickness of one-half inch can be fractured with as little as 1.5 gm/cm$^2$ liquid film of pure nitrogen trichloride. As a compound with a significantly lower vapor pressure than chlorine, it can concentrate if liquid chlorine, containing nitrogen trichloride, is allowed to evaporate. Nitrogen trichloride is thought to be the cause of explosions and fatalities in chloralkali production facilities.

Chlorine product is typically supplied as a liquid, but the end-user normally evaporates the liquid chlorine prior to use. Depending on how the chlorine is evaporated, this can lead to an increase in nitrogen trichloride concentration. A critical part of the chlorine production process is therefore to keep the nitrogen trichloride concentration low in the final chlorine product, typically only a few parts per million, to allow the end-user to safely evaporate the liquid chlorine. In the chloralkali process, nitrogen trichloride is often removed from the product chlorine through an absorption step, for example in a chlorine scrubber, prior to chlorine compression and liquefaction. In the scrubbing step, nitrogen trichloride is absorbed into fresh, clean product chlorine and pushed down the scrubber and into a holding tank, referred to as the nitrogen trichloride decomposer, containing carbon tetrachloride or sometimes chloroform. In the decomposer, the solvent is maintained at a temperature above the boiling point of the chlorine. When the liquid chlorine contacts the warm solvent, it flashes back into the chlorine scrubber while nitrogen trichloride is absorbed by the solvent. Conditions in the decomposer are selected so that nitrogen trichloride slowly and safely decomposes. In time, tars and other impurities build up in the solvent, and the solvent must be periodically replaced, generating a waste stream that must be disposed of.

For reasons of both regulatory constraints and product quality (i.e. to reduce organic content in the final product chlorine), it is desirable to avoid the use of solvents such as carbon tetrachloride and chloroform in the chlorine production train.

A method of disposing of nitrogen trichloride without using carbon tetrachloride or chloroform solvents is described in U.S. Pat. No. 3,568,409, Ferguson et al., in which gas chlorine from the drying tower is contacted with hydrochloric acid upstream of the compression and liquefaction steps. However, the process produces an acidic waste stream that must be disposed of or used elsewhere.

In the method described in U.S. Pat. No. 3,568,409, chlorine is vaporized and recycled back to process but this is done only after removing or destroying the nitrogen trichloride content. In the currently-practiced industrial process, chlorine is also vaporized and recycled back to process but only after nitrogen trichloride is absorbed into carbon tetrachloride or chloroform or other appropriate organic solvents. The vaporization of chlorine is an important step of most methods proposed for the removal of nitrogen trichloride from the final chlorine product of a chloralkali production facility.

Although it would be desirable to be able to vaporize the liquid chlorine stream containing a high concentration of nitrogen trichloride from the chlorine scrubber to avoid the use of a decomposer and organic solvents or the use of other chemicals that generate waste streams that must be handled, the chlorine vaporizers currently used in industry have shortcomings in vaporizing such streams. Industrial chlorine vaporizers are generally non-horizontal units, such as vertical bayonet style units, or horizontal vaporizer units, such as kettle reboiler style units. For convenience in the following discussion, non-horizontal units with a positive slope are referred to as "vertical" units, meaning units with an angle from the horizontal from 0.1 to 90 degrees. These horizontal and vertical chlorine vaporizers can be of two types, namely: pool boiling vaporizers and plug-flow vaporizers. In a pool boiling vaporizer, such as a vertical bayonet or kettle reboiler style vaporizer, liquid chlorine is evaporated out of a main body of liquid chlorine. Compounds with lower vapor pressure than chlorine concentrate in the main body of liquid chlorine as chlorine is evaporated. In an upward flow vaporizer, such as a Hooker-style vaporizer or tube vaporizer, liquid chlorine is evaporated as it moves through the vaporizer. In an upward flow vaporizer, depending on the developed flow regime, compounds with lower vapor pressure than chlorine can locally concentrate within the unit, as described below. Neither type of vaporizer is normally used to vaporize liquid chlorine containing a high concentration of nitrogen trichloride, because of the danger of concentrating it. Euro Chlor recommends that the concentration of nitrogen trichloride in liquid chlorine in "reboilers" be maintained below 1000 ppm to avoid excessive concentration. There is a balance between the tendency to concentrate and the tendency for nitrogen trichloride to decompose which is complex and not completely understood.

In a conventional vertical upward flow vaporizer, chlorine flows the length of the unit through three distinct regime zones. In the first zone, liquid chlorine is heated to its boiling point. In the second zone chlorine is evaporated and in the third zone the resulting chlorine gas is superheated. It is within the second zone, i.e. the boiling zone, of a vertical upward flow vaporizer that nitrogen trichloride can concentrate dangerously. However, reflux of liquid from the boiling zone to the preheat zone can also cause concentration.

In the boiling zone of a conventional vertical upward flow vaporizer, three flow regimes are commonly encountered. The first flow regime occurs at the beginning of boiling when little vapor has yet formed and a "churn" flow regime develops. In the churn flow regime, vapor and liquid randomly mix and back-mix. Once enough vapor is generated, an "annular" flow regime develops, where vapor flows through the center of the heat transfer chamber (e.g., tube) pushing the liquid forward and against the heat transfer wall. Finally, sufficient vapor is generated to take the system into a "mist" flow regime, where the liquid is broken down into small droplets that randomly mix with the vapor while it moves forward through the boiling zone. It is in the boiling zone where a churn flow regime is present that nitrogen trichloride can concentrate and mass build-up. In this zone, liquid chlorine can back-mix and local "pool" boiling can develop.

Once the annular flow regime develops within the boiling zone, the liquid is forced forward by the vapor generated, and back-mixing, and therefore nitrogen trichloride accumulation, is minimal.

Back-mixing is also minimal in the mist flow regime. As liquid flows forward through the annular and mist flow regimes, liquid chlorine is evaporated faster than the dissolved nitrogen trichloride. However, the mass of nitrogen trichloride in the liquid is decreasing and not accumulating.

In a conventional vertical upward flow chlorine vaporizer it is difficult to ensure that nitrogen trichloride concentrations do not increase substantially in the zone where the liquid and churn flow regimes are present, and before the annular flow regime is achieved. As a result, this type of vaporizer is not typically used to handle liquid chlorine streams rich in nitrogen trichloride.

In a horizontal or downward slope plug-flow vaporizer, the opportunity of evaporating the liquid chlorine without back-mixing (i.e., without locally concentrating nitrogen trichloride) is substantially increased relative to a vertical upward flow unit. In these units gravity forces the liquid chlorine to flow forward with more and more of the volume of the unit taken by the generated vapor. If properly designed, the boiling churn zone can be avoided altogether. However, the concern with these types of units is that they can be accidentally flooded, for example, by exceeding their vaporization capacity (i.e., feeding too much liquid chlorine). Once flooded, evaporating the liquid chlorine leads to pool boiling rather than plug-flow vaporization. This causes nitrogen trichloride to concentrate, which can lead to an unsafe condition. On the other hand, a vertical upward flow vaporizer flooded with liquid chlorine is quickly drained back to the feeding tank as soon as enough vapor chlorine is generated again, avoiding pool boiling conditions.

In summary, vertical upward, horizontal, and downward flow vaporizers all have shortcomings in dealing with liquid chlorine streams rich in nitrogen trichloride. There is a need in the industry for an improved method of vaporizing chlorine streams containing a high concentration of nitrogen trichloride.

It would also be desirable to provide a process for disposing of the nitrogen trichloride removed from the chlorine stream without using organic solvents such as carbon tetrachloride or chloroform, or other liquid chemicals.

SUMMARY OF THE INVENTION

The invention provides a method of vaporizing liquid chlorine containing nitrogen trichloride in a plug-flow vaporizer oriented non-horizontally and having an upward flow direction. The method comprises receiving a stream comprising liquid chlorine containing nitrogen trichloride, introducing a gas into the liquid stream upstream of a boiling zone of the vaporizer to induce a flow regime in the liquid stream that prevents or minimizes any mass accumulation of nitrogen trichloride in the boiling zone, and vaporizing the liquid stream to produce a stream comprising chlorine gas and nitrogen trichloride gas.

According to some embodiments, the method includes processing the vaporized stream by destroying the nitrogen trichloride therein, to produce a stream comprising chlorine gas with nitrogen gas formed by decomposition of the nitrogen trichloride. The stream comprising chlorine gas with nitrogen gas may be recycled to the chlorine train of a chlorine production process.

The invention also provides an apparatus for carrying out the methods of the invention. The apparatus comprises a plug-flow chlorine vaporizer oriented non-horizontally and having an upward flow direction. The apparatus has an inlet for receiving a stream of liquid chlorine containing nitrogen trichloride into the vaporizer. There is a boiling zone in the vaporizer downstream of the liquid inlet. The apparatus has a gas inlet upstream of the boiling zone for introducing a gas into the liquid stream, the gas being, for example, air, nitrogen or chlorine gas.

The invention accordingly provides a method and apparatus to safely evaporate a liquid chlorine stream rich in nitrogen trichloride. The chlorine vaporization process presents an effective mean of avoiding a churn flow regime within the boiling zone of an upward plug-flow chlorine vaporizer, and therefore providing the means to safely vaporize liquid chlorine containing a high concentration of nitrogen trichloride, e.g. greater than 50 ppm. Because of the vertical position of the vaporizer, accidental flooding of the vaporizer does not lead to pool boiling, avoiding the potential for nitrogen trichloride concentration. The process includes the introduction of gas (vapor), at any point upstream of the boiling zone of a chlorine vaporizer, in sufficient quantity to force the feed liquid chlorine into any flow regime not leading to significant back-mixing or pool boiling within the boiling zone of the vaporizer. The plug-flow vaporizer can be oriented at any angle from 0.1° to 90° from the horizontal position. The gas introduced into the liquid stream can be any suitable gas or vapor, for example but not limited to air, nitrogen, chlorine gas, hydrogen, helium and oxygen, and mixtures thereof. The liquid chlorine feed to the vaporizer is forced into an appropriate flow regime before it reaches the boiling zone of the vaporizer, hence allowing the safe vaporization of liquid chlorine.

These and other features of the invention will be apparent from the following description and drawings of particular embodiments.

DETAILED DESCRIPTION OF THE INVENTION

Figure 1:
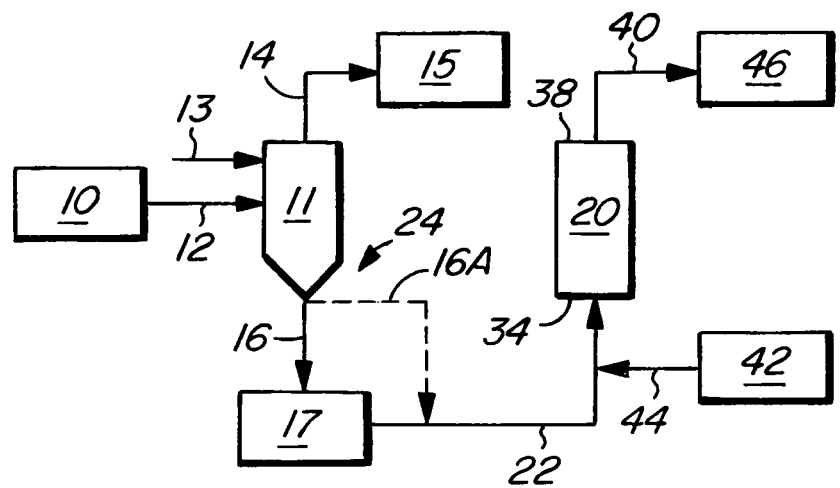
FIG. 1 is a schematic diagram of a first embodiment of the process of the invention.

In the following description and in the drawings, corresponding and like elements are referred to by the same reference characters.

In a first embodiment of the process of the invention, illustrated in FIG. 1, a vertical upward plug-flow vaporizer 20 receives a stream of liquid chlorine containing nitrogen trichloride (stream 22) from the chlorine production train 24 of a chloralkali plant. The production train 24 includes a chloralkali cell house 10 in which chlorine gas is produced by the electrolysis of brine. A chlorine scrubber 11 receives a stream 12 of gas chlorine from the cell house and receives a liquid chlorine stream 13. Other unit operations usually present between the chloralkali cell house 10 and the chlorine scrubber 11 are not shown in the drawings. A gas chlorine stream 14 from the scrubber is fed to a compressor 15 and is thereafter liquified. From the bottom of the chlorine scrubber 11, liquid chlorine, rich in nitrogen trichloride (stream 16), is fed to a holding tank 17, from which a stream 22 is routed to the vaporizer 20. Alternatively, the liquid chlorine, rich in nitrogen trichloride, may be fed directly from the scrubber 11 to the vaporizer 20 (stream 16A) without using any holding tank. The stream 22 typically has 50 ppm or more of nitrogen trichloride.

Figure 2:
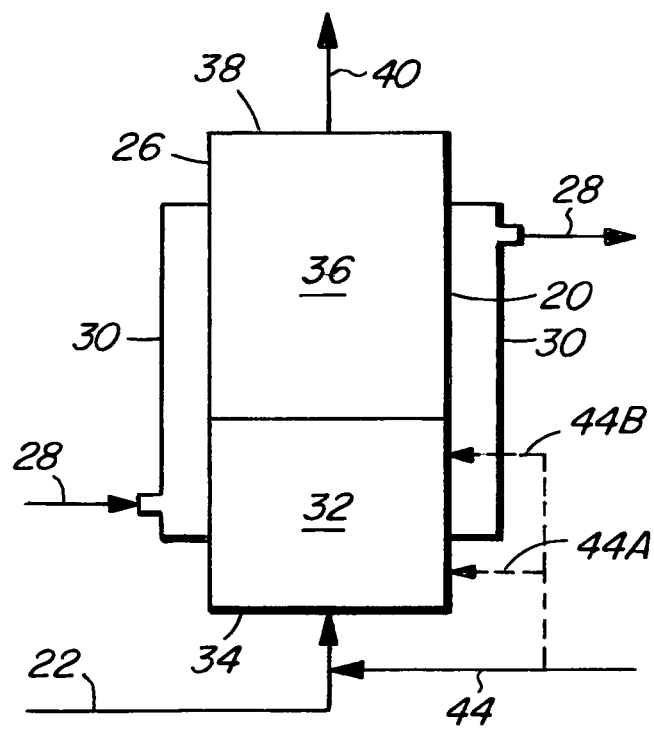
FIG. 2 is a schematic diagram of the chlorine vaporizer.

The vaporizer 20 is illustrated in FIG. 2. It is oriented substantially vertically, but it may be oriented at any angle from the horizontal in the range of 0.1 to 90°; that is, the vaporizer is non-horizontal, sloping upward and has an upward flow direction. The vaporizer 20 has a body 26 and is heated by a stream 28 of heating medium flowing through a heating jacket 30. The vaporizer 20 has a heating zone 32 at the inlet end 34, in which the liquid stream is heated, and a boiling zone 36 downstream of the heating zone, in which the liquid chlorine is evaporated. At the outlet end 38 of the vaporizer, a stream 40 of chlorine gas and nitrogen trichloride gas exits the vaporizer.

A gas such as air, nitrogen or chlorine gas, or mixtures thereof, from a gas source 42 (stream 44) is introduced into the stream 22 of liquid chlorine and nitrogen trichloride upstream of the boiling zone 36 of the vaporizer. The gas stream 44 may be introduced into the liquid stream 22 before entry into the vaporizer, or it may be introduced directly into the heating zone 32 of the vaporizer, as indicated by optional streams 44A and 44B shown in FIG. 2.

The gas stream 44 is fed at a flow rate sufficient to force the feed liquid chlorine into a flow regime within the vaporizer 20 that does not permit significant back-mixing or pool boiling within the boiling zone 36 of the vaporizer. Examples of such flow regimes are annular and mist flow regimes. The flow rate of the gas stream 44 may be in the range of 0.01 to 10 kg of gas per kg of liquid chlorine, alternatively 0.01 to 1 kg, alternatively 0.02 to 0.15 kg of gas per kg of liquid chlorine. The effect is to keep the nitrogen trichloride from accumulating within the pool and boiling zone of the vaporizer as the chlorine and nitrogen trichloride evaporate. Although the concentration of nitrogen trichloride increases through the boiling zone, due to the higher vapor pressure (lower boiling point) of chlorine, the induced flow regime limits the concentration increase and the mass accumulation of nitrogen trichloride within the vaporizer to levels that are safe to handle.

At the outlet end 38 of the vaporizer, a stream 40 comprising chlorine gas with nitrogen trichloride gas and the gas fed into the liquid stream is sent for further processing at step 46. For example, the stream 40 may be routed to a hydrochloric acid plant, in which chlorine is reacted with hydrogen to make hydrochloric acid. Alternatively, the gas stream 40 may be absorbed in a hypochlorite system. Another option is to destroy the nitrogen trichloride and recycle the stream 40 to the chlorine production train, as explained below.

Figure 3:
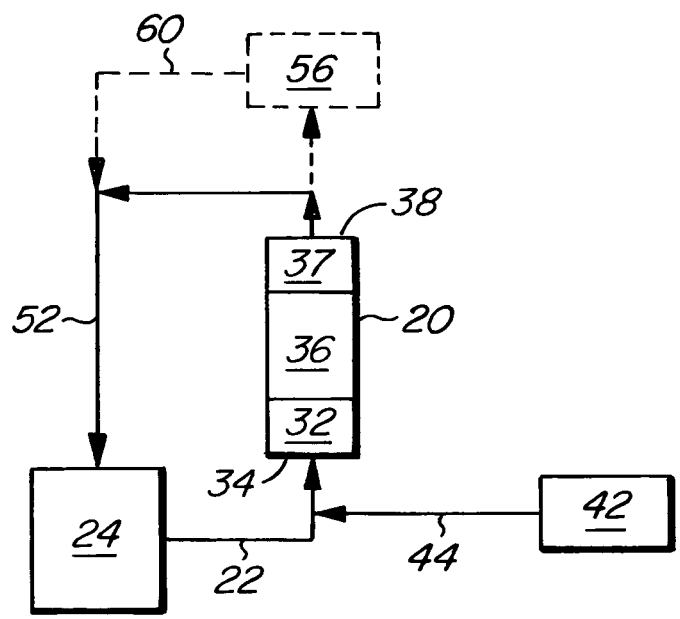
FIG. 3 is a schematic diagram of a second embodiment of the process, in which nitrogen trichloride is destroyed using a superheater.

In a second embodiment of the process of the invention, the gas mixture produced in the vaporizer 20 is routed to one or more unit operations for the destruction of nitrogen trichloride. The gas leaving the nitrogen trichloride destruction step, i.e. chlorine gas and nitrogen gas, is recycled back to the chlorine train of the chloralkali process. The invention thus avoids the generation of a waste stream or the addition of other chemicals or solvents to deal with the nitrogen trichloride. The step of destroying the nitrogen trichloride can be carried out in various ways. For example, the gas mixture evaporated in the vaporizer may be introduced into a superheater, which may be part of the vaporizer unit. This is illustrated in FIG. 3, in which the vaporizer 20 includes a superheater zone 37 downstream of the boiling zone 36. The operating conditions in the superheater are selected so as to achieve substantially complete destruction of nitrogen trichloride. The average operating temperature of the superheater may be in the range of 30° to 300° C., the operating pressure in the range of 0.5 to 100 bar, and the residence time in the range of 0.5 seconds to 5 minutes. Alternatively, the average operating temperature may be in the range of 35° to 250° C., the operating pressure in the range of atmospheric pressure to 90 bar, and the residence time in the range of 1 second to 3 minutes.

The gas stream 52 leaving the superheater, comprising chlorine gas and nitrogen gas, is recycled back to the chlorine production train 24 of the chloralkali process.

Figure 4:
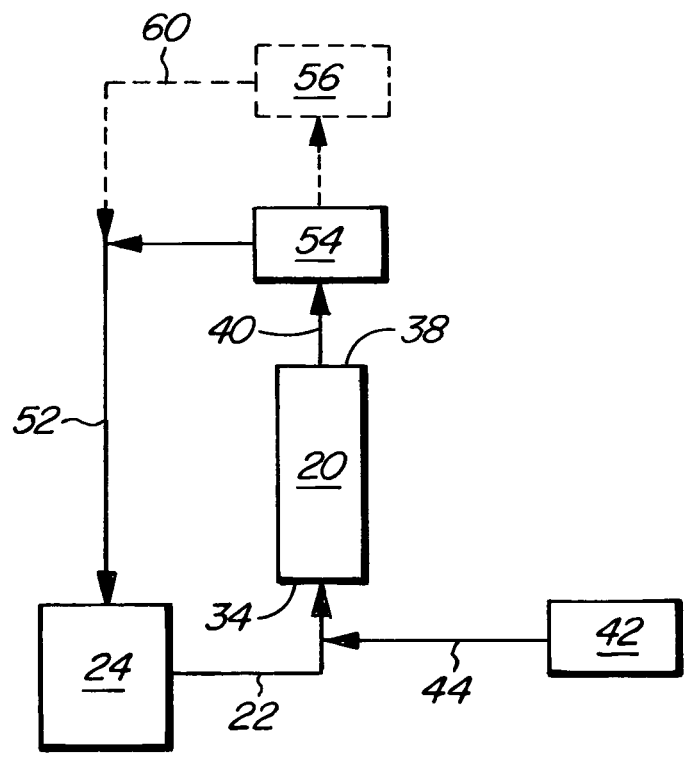
FIG. 4 is a schematic diagram of a third embodiment of the process, in which nitrogen trichloride is destroyed using a catalytic bed.

As an alternative to using a superheater, and as illustrated in FIG. 4, the gas evaporated in the vaporizer 20 can be routed to a catalytic bed 54 in which the nitrogen trichloride is destroyed. The catalytic bed may contain, for example, Monel (trademark) as a catalyst to destroy nitrogen trichloride. The catalytic bed may be operated at temperatures in the range of minus 40 to 300° C., pressures in the range of 0.5 to 100 bar, and a residence time in the range of 0.1 seconds to 5 minutes. The gas stream 52 leaving the catalytic bed, comprising chlorine gas and nitrogen gas, is recycled back to the chlorine production train 24 or can be routed to other unit operations.

Optionally, the process may use both a superheater and a catalytic bed to destroy the nitrogen trichloride. The catalytic bed may be within a superheater zone of the vaporizer, rather than being a separate unit.

Optionally, the gas leaving the nitrogen trichloride destruction step, e.g. the superheater or catalytic bed, may be routed to a temperature conditioning step 56 before being recycled back to the chlorine train (stream 60), as shown in FIGS. 3 and 4. This reduces the temperature of the gas stream leaving the nitrogen trichloride destruction step, which may be at a temperature of about 80° to 120° C., to a lower temperature for introduction into the chlorine train, which may be at a temperature of about minus 35° C.

Although the invention has been described in terms of various embodiments, it is not intended that the invention be limited to these embodiments. Various modifications within the scope of the invention will be apparent to those skilled in the art. The scope of the invention is defined by the claims that follow.

What is claimed is:

1. A method of vaporizing liquid chlorine containing nitrogen trichloride in a plug-flow vaporizer oriented non-horizontally and having an upward flow direction, comprising the steps of:
   (a) receiving a stream comprising the liquid chlorine containing at least 50 ppm nitrogen trichloride into the vaporizer;

(b) introducing a gas into the stream of step (a) upstream of a boiling zone of the vaporizer at a as flow rate that induces a flow regime in the stream of step (a) that minimizes mass accumulation of the nitrogen trichloride in the boiling zone of the vaporizer; and (c) vaporizing the liquid chlorine containing nitrogen trichloride from step (b) to produce a stream comprising chlorine gas and nitrogen trichloride gas.

2. A method according to claim 1, wherein the stream of step (a) is received from a chlorine production train of a chlorine production plant.

3. A method according to claim 1, wherein the stream of step (a) is received from a chlorine scrubber.

4. A method according claim 1, wherein the gas comprises air, nitrogen or chlorine vapor, or mixtures thereof.

5. A method according to claim 1, wherein the gas comprises air, nitrogen, chlorine vapor, hydrogen, helium or oxygen, or mixtures thereof.

6. A method according to claim 1, where the gas has a flow rate in the range of 0.01 to 10 kg of gas per kg of liquid chlorine.

7. A method according to claim 1, wherein the vaporizer is oriented at an angle to the horizontal in the range of 0.1 to 90 degrees.

8. A method according to claim 1, wherein the flow regime of step (b) is one of annular flow and mist flow.

9. A method according to claim 1, wherein the flow regime of step (b) minimizes pool boiling of the liquid chlorine in the boiling zone.

10. A method according to claim 1, wherein the flow regime of step (b) minimizes back-mixing of the liquid chlorine in the boiling zone.

11. A method according to claim 1, further comprising, after step (c), (d) processing the stream of step (c) by destroying the nitrogen trichloride therein, to produce a stream comprising chlorine gas and nitrogen gas.

12. A method according to claim 11, wherein step (d) comprises heating the stream of step (c) to a temperature in the range of 30 to 300 degrees C., at a pressure in the range of 0.5 to 100 bar for a residence time in the range of 0.5 seconds to 5 minutes.

13. A method according to claim 11, wherein step (d) is done in a superheater.

14. A method according to claim 13, wherein the superheater contains a catalytic bed containing a nitrogen trichloride-destroying catalyst.

15. A method according to claim 11, wherein step (d) comprises introducing the stream of step (c) into a catalytic bed containing a nitrogen trichloride-destroying catalyst.

16. A method according to claim 14, wherein the catalytic bed operates at a temperature in the range of minus 40 degrees to 300 degrees C. and a pressure in the range of 0.5 to 100 bar for a residence time in the range of 0.1 second to 5 minutes.

17. A method according to claim 11, further comprising, after step (d), conditioning the temperature of the stream of step (d).

18. A method according to claim 11, further comprising recycling the stream comprising chlorine gas and nitrogen gas produced in step (d) to a chlorine production train of a chlorine production plant.

19. A method according to claim 18, in which the method is free of any waste stream production and free of any addition of nitrogen trichloride treatment chemicals.

* * * * *